(12) United States Patent
Gerbier et al.

(10) Patent No.: US 7,401,467 B2
(45) Date of Patent: Jul. 22, 2008

(54) PUMP ASSEMBLY FOR HAND FORK-LIFT TRUCK

(75) Inventors: Stéphane Gerbier, Occagnes (FR); Ernst-Peter Magens, Ammersbek (DE); Frank Maenken, Henstedt-Ulzburg (DE); Nis-Georg Nissen, Brokstedt (DE); Martin von Werder, Ammersbek (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 806 days.

(21) Appl. No.: 10/935,878

(22) Filed: Sep. 8, 2004

(65) Prior Publication Data

US 2005/0079078 A1 Apr. 14, 2005

(30) Foreign Application Priority Data

Sep. 11, 2003 (DE) ................ 103 42 436

(51) Int. Cl.
*B62B 3/065* (2006.01)
*B66F 9/06* (2006.01)
*B66F 9/22* (2006.01)

(52) U.S. Cl. .......................... 60/479; 60/482

(58) Field of Classification Search .......... 60/477, 60/478, 479, 482; 417/440

See application file for complete search history.

(56) References Cited

U.S. PATENT DOCUMENTS

| 4,223,901 A | * | 9/1980 | Klemick | .......... 280/43.12 |
| 4,589,669 A | * | 5/1986 | Kedem | .......... 280/43.12 |
| 6,035,635 A | * | 3/2000 | Hung | .......... 60/479 |
| 6,247,307 B1 | * | 6/2001 | Hung | .......... 60/479 |

FOREIGN PATENT DOCUMENTS

| DE | 3602510 C2 | 3/1989 |
| DE | 41 36 820 C1 | 4/1993 |

* cited by examiner

*Primary Examiner*—Thomas E. Lazo
(74) *Attorney, Agent, or Firm*—Vidas, Arrett & Steinkraus

(57) ABSTRACT

Pump assembly for the lift cylinder of a hand fork-lift truck includes a piston pump activated by a bar of a hand fork-lift truck and has a piston chamber and an annulus collector. A three stage control valve connects the lift cylinder with a tank in the lowered setting and connects the piston chamber with the tank in a neutral setting and in a pump setting, connects the piston chamber with the lift cylinder through a first check-valve, with the tank through a second check-valve, a third check-valve between the piston chamber and the annulus collector open to the piston chamber, and a reversing valve between the piston chamber and the annulus collector.

19 Claims, 6 Drawing Sheets

PUMP ASSEMBLY FOR HAND FORK-LIFT TRUCK

FIELD OF THE INVENTION

The invention relates to a pump assembly for a lifting cylinder of a hand fork-lift truck.

BACKGROUND OF THE INVENTION

Raising and lowering the load-fork of a hand fork-lift truck is normally performed with a hydraulically operated singled-sided lifting cylinder. The lifting cylinder is supplied with a piston pump which is actuated mechanically through a pumping action of a bar. The ratio, pump volume to displacement volume is normally designed so that the load can be raised with an acceptable number of pumping actions on the bar without the operator having to use too much power for lifting a full load. Consequently, this design presents a compromise between the acceptable number of pumping actions on one hand and the power to be used on the other. In many cases, the relatively large number of pumps is not acceptable however, especially with smaller loads. In most cases, the load fork also has to be raised by a certain amount before it takes on the weight of the load from underneath. The operator desires quicker lifting action for this distance.

A so-called quick-lift version is also planned for this kind of pump assembly therefore. The transmission ratio between the piston-pump and the lifting cylinder is reduced in this case. Switching from the quick-lift variation to the heavier ratio is necessary when taking on a certain load. Two different solutions are already known for this. For each of them, an additional valve is necessary. One embodiment has the lifting cylinder in two stages. In one operating version, a limited effective area takes on the pump pressure. In the second operating version, the first effective area is supplemented by a second effective area which is connected with the piston pump through a pilot controlled check-valve. The disadvantage in these cases, is the working length of the lifting cylinder which is almost double the length of standard lift cylinders.

A second solution reversing the pump volume. A reversing valve is situated between the piston chamber and the annulus collector of the piston pump and parallel to this is a check-valve. The reversing valve is controlled by the pressure in the output line of the piston chamber. If this achieves a certain value, the reversing valve opens and connects the piston chamber and annulus collector of the pump. The effective piston surface of the pump piston is therefore reduced to the difference of the effective surfaces in the piston chamber and annulus collector. In one popular solution, the described functionality is made effective in that a valve element is pressed against the sealing surface by a spring which is held in a hole in the pump piston. The hole is connected with the piston chamber and with the annulus collector with a radial opening. If pump pressure exceeds a predefined value, the valve element is opened and the medium flows into the annulus collector. The radial gap that is created here is very small so that significant throttle losses occur. The resulting, system-related loss of force that is characterized by the product from reversing pressure in the annulus collector and the difference from the base and rod surface of the pump piston. Since the reversing valve is opened and closed in time with the pump movement of the bar in this solution, the force that is required is relatively high in normal lifting operation compared with the load forces based on the described loss.

SUMMARY OF THE INVENTION

The object of the invention is to provide a pump assembly with two lifting pump ratios and so that switching between the two using pump-pressure or load-pressure is trouble-free and can be performed with the least possible lifting function loss.

In the pump assembly according to the invention, the valve element, a sliding valve element for example, provides a seal on the spring-side and is pressed against the spring-side with a constant pressure. This pressure can be atmospheric pressure, tank pressure or can be provided by an enclosed spring space having a predefined pressure. This can be atmospheric pressure, positive pressure or vacuum. Since the reversing valve has such a short movement, the pressure in the enclosed spring-room is not changed to any mentionable degree.

In the solution according to the invention, the reversing valve switch is not made by the difference pressure between the annulus collector and the piston chamber but by the absolute pressure of the piston chamber. Unwanted power-loss is avoided in this way.

According to one aspect of the invention the control pressure for the reversing valve is not pump pressure, it is load pressure. While one switch operation occurs for every stroke using the pump pressure as control pressure for the reversing valve, the load controlled reversing valve only switches once, if the respective reaction pressure has been achieved.

Even here, the side of the valve element that is opposite the control pressure has constant pressure on it, for example, the environmental pressure or a certain pressure in the spring enclosure or tank pressure. A spring enclosure has the advantage that when the seal is broken, oil cannot leak out to the exterior.

To make a smooth switch between the two pump volumes, one embodiment of the invention plans a throttle for the reversing valve. In quick-lift operation, the ring room is not full of hydraulic oil and is evacuated with every pump stroke. When switching, the annulus collector is flooded in a burst, which gives the operator an unpleasant feeling through the pumping bar and also causes a noise. A throttle prevents the immediate flooding of the annulus collector without any significant loss of the normal pump operational functionality.

The piston chamber of the pump is filled through a check-valve during the suction stroke so that oil can be sucked out of the reservoir. When switching from suction to pump stroke, hydraulic oil can flow back to the reservoir before the check-valve can close. This happens in a dead-space in the pump piston movement. Therefore, one embodiment of the invention presents the advantage of keeping the second check-valve in the closed position with spring tension. This minimizes the distance to achieving the required switching pressure.

Another embodiment of the invention plans that switching the reversing valve happens so that the annulus collector is connected with the tank before the reversing valve switches and joins the piston chamber and the annulus collector. This solution is advantageous in that the annulus collector is not evacuated when the switch is made and therefore requires no volume current for building up pressure in the annulus collector. In this solution, plunging the lever bar down into center position when the reverse switch is made can therefore be prevented.

In another embodiment of the invention, the pump piston is designed to have an axial hole in which a guide section of the valve element is run axially and is sealed. A seal is located on the guide section, and the valve element has a ring-formed valve seat on the opposite end which works together with a sealing surface. An area that is enclosed by the sealing surface is connected with the piston chamber through a channel in the pump piston, and an axial gap between the valve element and the walls of the hole which is connected with the annulus collector. When raising the valve surface from the sealing surface, the piston chamber and the annulus collector are joined. In another embodiment, a valve ball is forced with a spring against the end of the axial hole section in the enclosed area. A channel in the pump piston is planned under the valve ball. When the valve ball is opened, it creates another connection between the pump chambers. This is used for returning the hydraulic oil from the annulus collector to the piston chamber during the suction stroke of the pump assembly.

As described above, the control valve is designed so that the pump either sucks hydraulic oil from the tank and feeds into the lift cylinder in the pump stroke depending on the position of the pump. In lowering operation, hydraulic oil is to return from the lift-piston into the tank. The pump is connected with the tank in neutral position. For this type of control valve arrangement, we know that the check-valve, which enables the pump to suck from the pump during pumping operation and to feed hydraulic oil into the lifting cylinder, is to be put between two opposing tappets. One tappet is connected with a valve element which opens under pump pressure and makes the connection with the lifting cylinder and the other tappet is connected with an actuation of the control valve and holds the valve ball at a distance from the seat in neutral position. In lowering operation, this tappet presses the valve ball against the other tappet to bring the spring-loaded valve element into the open position so that hydraulic oil can flow from the lifting cylinder into the tank. The described valve arrangement is normally a vertical or horizontal arrangement. In pump operation, the valve ball therefore is a distance from the valve seat. This has to be bypassed before the line between the pump arrangement and the tank is blocked. According to the invention, the plan calls for the tappet that is connected with the valve element is forced with a spring and the preliminary fill valve, i.e. the check-valve for preliminary fill operation, is steadily held against the valve seat. This ensures that this will be achieved relatively quickly with the respective pump or load pressure in order to actuate the reversing valve. If this kind of measure is not taken, the operator will experience a certain dead-space in the actuation of the bar until the valve ball is properly seated and therefore there will be a large evacuated annulus collector that must be filled after switching. This will in turn lead to another undesired dead-space.

BRIEF DESCRIPTION OF THE DRAWINGS

The exemplary embodiment drawings describe this in more detail.

DETAILED DESCRIPTION OF THE PREFERRED EMBODIMENTS

Figure 1:
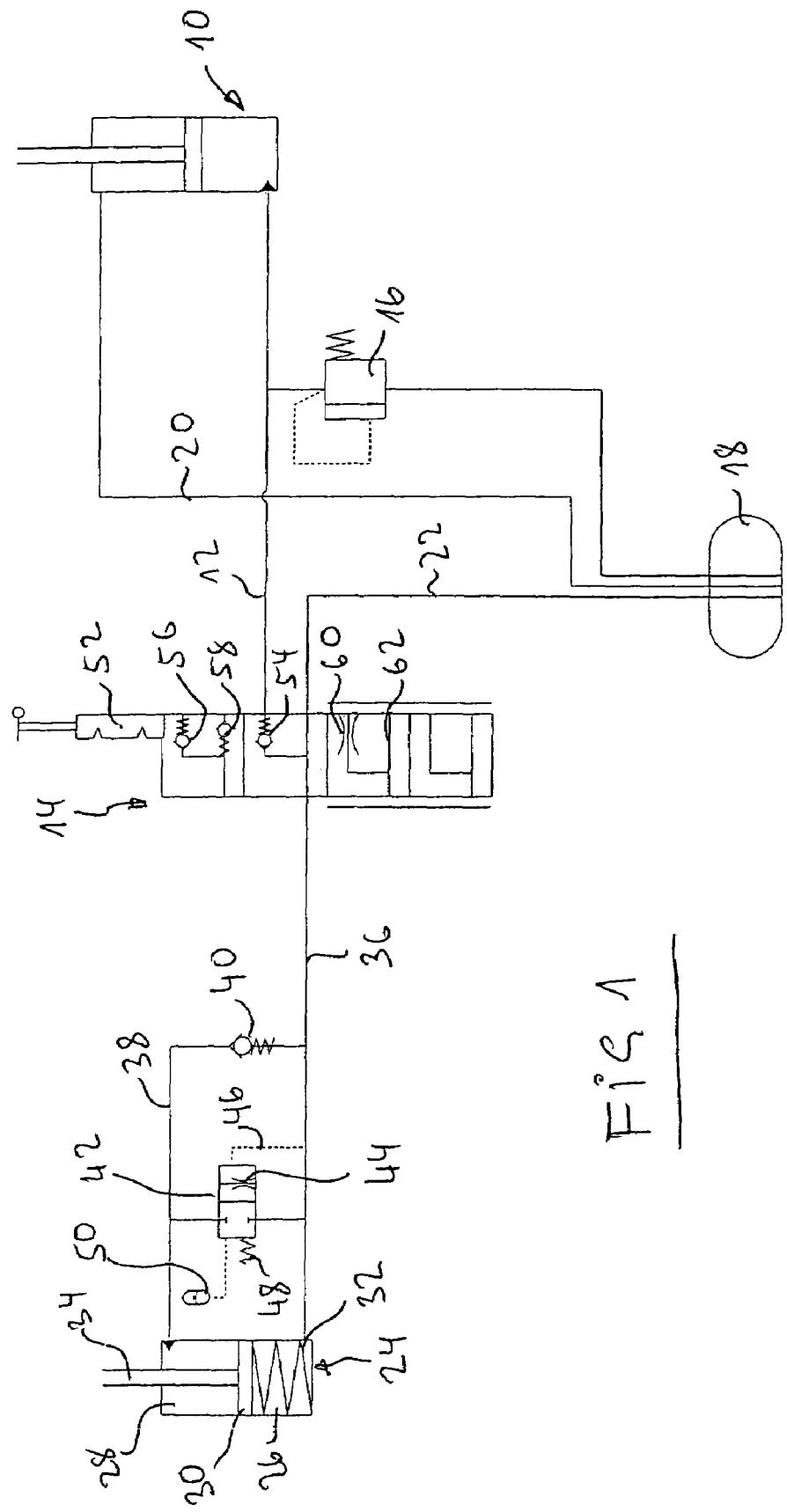
FIG. 1 is a block diagram of a pump arrangement according to the invention.

In FIG. 1, a lift cylinder 10 is indicated for a hand fork-lift truck. Integration of the invention into the hand fork-lift truck is not shown and known. The piston chamber of the single-side lift cylinder 10 is connected with a control valve arrangement 14 with a line 12. An over-pressure valve 16 is also connected with a tank 18. A line 20 leads to the tank and is connected with the annulus collector of the lift cylinder 10. A third tank line 22 is connected with the control valve arrangement 14. A piston pump 24 has a piston chamber 26 and an annulus collector 28, the spaces of which are split with a piston 30. A return spring 32 lifts the pump into the upper dead point. A piston rod 34 is connected using a suitable cinematic with the bar of the hand fork-lift truck (not shown). As per standard, this type of piston pump 24 is actuated with a pumping action on the bar.

A pump line 36 connects the piston chamber 26 with the control valve arrangement 14. A branch line 38 connects the lines 36 with the annulus collector 28 through a check-valve 40 which opens to the line 36 against a spring. A reversing valve 42 is situated between the lines 36, 38 and when opened by means of a throttle 44, connects lines 36, 38 and therefore the spaces 26, 28. The valve element that is not shown is pressurized with a control line 46 with pressure in line 36. A spring 48 presses against the other side. The valve element is sealed on the spring side and the spring-chamber is connected with an accumulator 50. This produces a constant pressure in the spring-chamber. Instead of the accumulator 50, a direct connection to the spring-chamber can be achieved with atmosphere which also guarantees constant pressure.

An actuation element 52 for the control valve arrangement 14 is activated from the head of the bar that is not shown here and enables the control valve arrangement 14 to be set in three positions. That shown in FIG. 1 is the piston chamber 26 connected with the tank 18 and the hydraulic oil in the piston chamber of the lifting cylinder 10 is blocked by a check-valve 54 in the control valve arrangement 14. Pushing the actuation element 52 downward for the pump operation causes a check-valve 56 to connect with line 12 and a third check-valve 58 with line 22. This allows the piston pump 24 to suck hydraulic oil from the tank 18 through check-valve 58 when the piston 30 is raised and to press it through the check-valve 45 into the piston chamber of the lift cylinder 10 on the pump stroke.

If the actuation element 32 is lifted upward, a throttle 60 in the control valve arrangement 14 is connected with the piston chamber of the lift cylinder 10 and a through-put channel 62 is connected to tank 18 through line 22. This allows hydraulic oil 10 to flow to the tank 18 through the throttle 60 and the cushioned downward movement of the piston in lift cylinder 10. The described functionality is generally known.

If the pump pressure in the line 36 achieves a predefined value, the reversing valve 42 opens against the spring 48 and the constant pressure 50 and connects the piston chamber 26 and the annulus collector 28. Previously, only the large piston surface held the hydraulic oil, which caused a relatively large amount of oil to flow to the lift cylinder 10 and therefore brings about a so-called quick-lift. It is to be understood that this type of quick-lift is only possible with small and medium loads. Heavy loads which are noticeable through hoisting the pump pressure lead to switching the reversing valve 42. This only uses the amount of oil that is produced from the difference of the displaced volume in piston chamber 26 and the volume that is won in annulus collector 28. The lift of the piston pump 24 therefore leads to a perceptibly shorter lift distance of the lift cylinder 10, but with much less required power against the larger ratio. The described reversing valve 42 construction prevents undesirable power loss.

In the described quick-lift operation, it alternates between compression and evacuation in the annulus collector of the piston pump 24. If now, during a pump stroke, reversing valve 42 opens, the hydraulic oil flows into annulus collector 28 with a burst. This causes noise on one hand and the operator feels a jolt when pushing the bar down on the other. The throttle 44 reduces the jolt of the flow into the annulus collector 28 and improves ergonomics.

Figure 2:
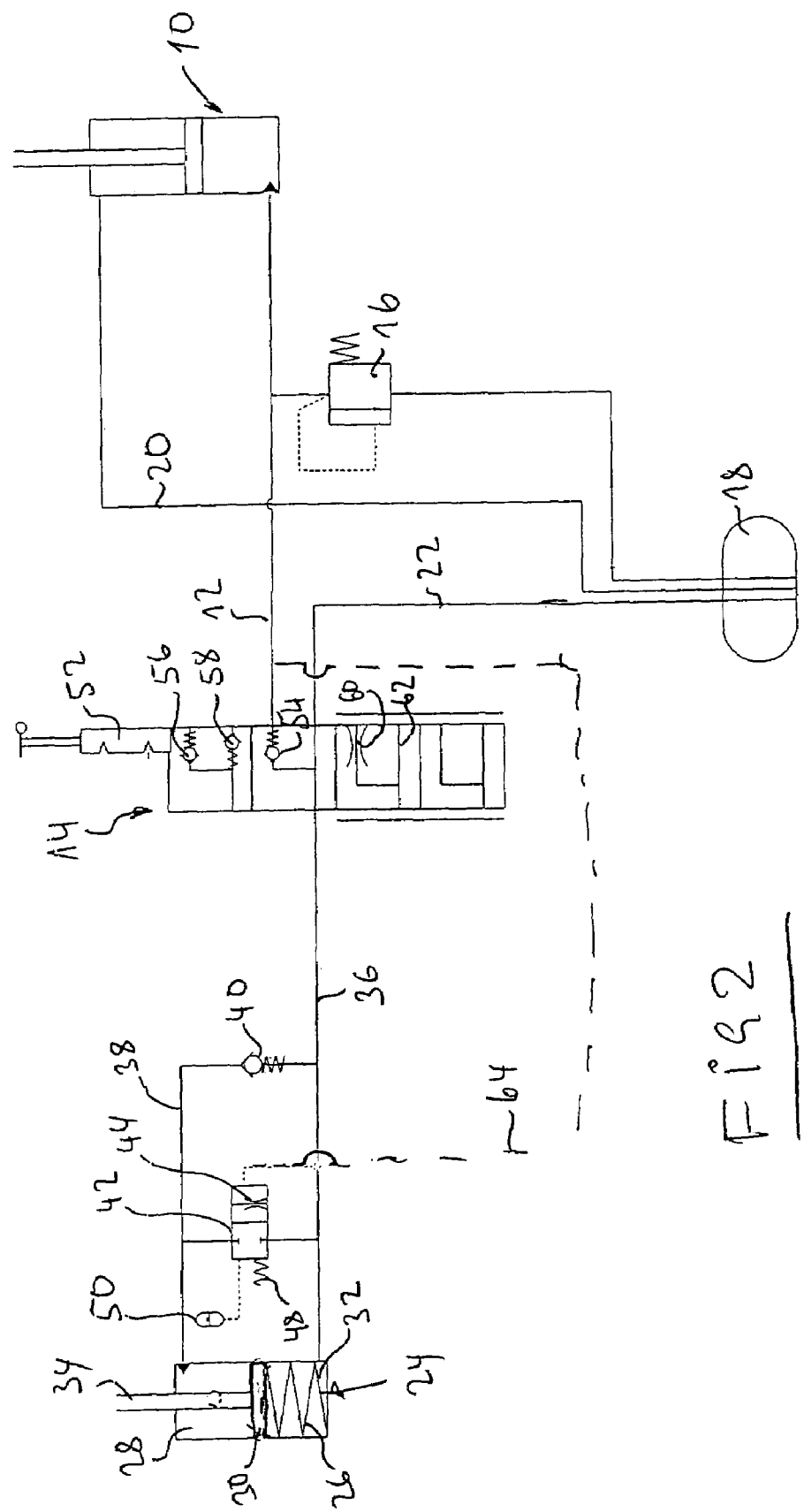
FIG. 2 shows a block diagram of a second embodiment of the pump arrangement according to the invention.

As long as the same components are shown in FIG. 2 as in FIG. 1, the same reference numbers will also be used. The difference between FIG. 1 and FIG. 2 is that the control input of the reversing valve 42 is connected with line 12 through line 64 in FIG. 2. The control pressure for the reversing valve 42 is therefore not the pump pressure which changes with the pulsing of the piston pump 24 but the load pressure that is found in line 12. While in the embodiment according to FIG. 1, the reversing valve 42 continues to open and close with the respective reaction pressure, the reversing valve 42 is activated once when a certain load pressure is achieved. The reversing valve 42 remains switched until the load pressure either exceeds or at least achieves the defined value.

Figure 3:
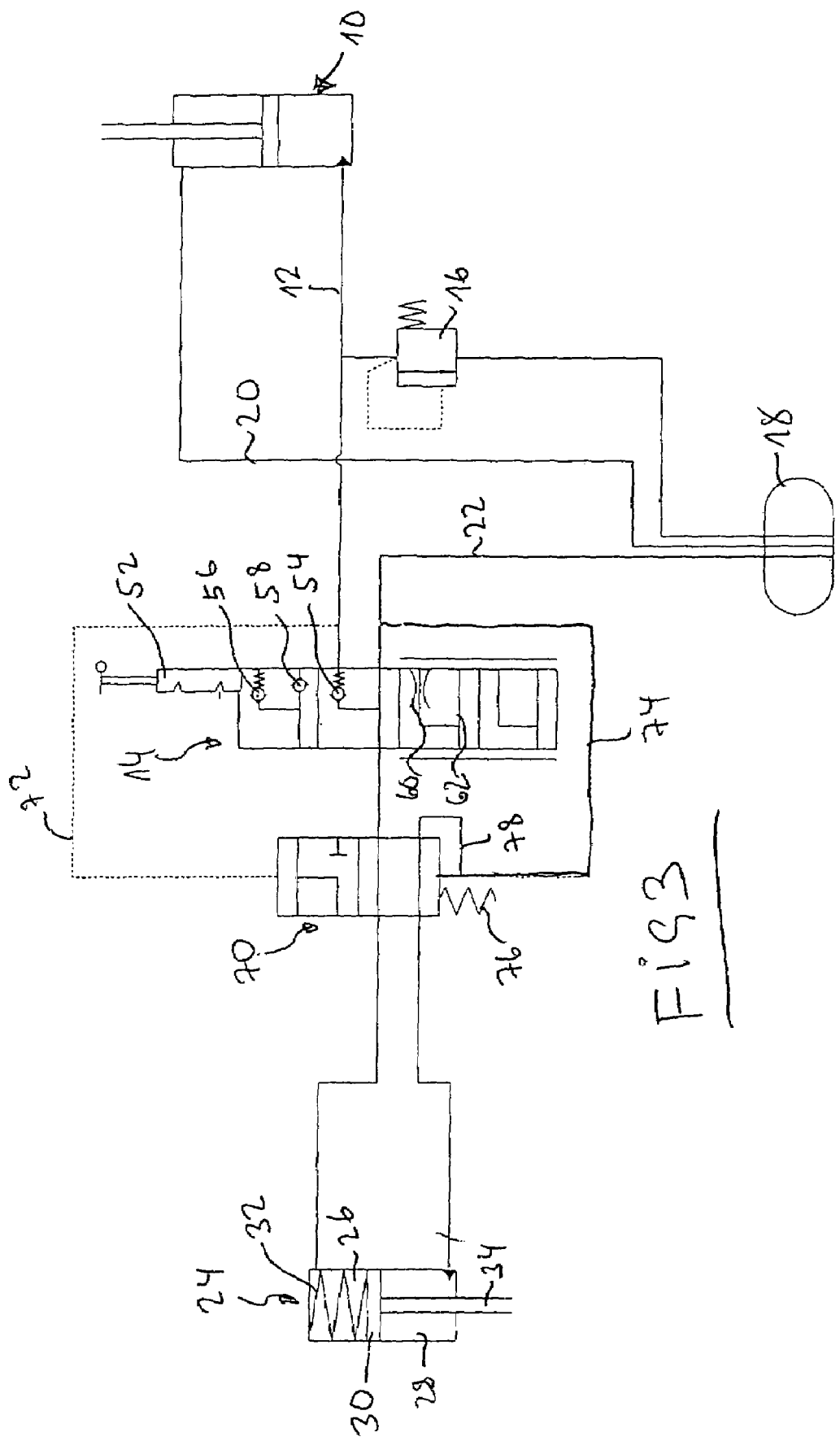
FIG. 3 shows a block diagram of a third embodiment of the pump arrangement according to the invention.

As long as FIG. 3 uses the same parts as are used in arrangements according to FIG. 1 and FIG. 2, the same reference numbers will be used. A reversing valve 70, for which the construction is not described, has a first control input which is continually connected with line 12 through a line 72. The second control input on the other side is permanently connected through line 74 with the tank through line 22. A pretension spring 76 presses on the same side. A branch line 78 also leads from the line 74 to an input of the reversing valve 70. The reversing valve opens if the load pressure in line 12 achieves or exceeds a predefined value. In this case, a connection is made between piston chamber 26 and annulus collector 28 as described above for lifting operation with a large ratio. In quick-lift operation, the annulus collector 28 is permanently connected with the tank 18 and therefore is filled with hydraulic oil. This ensures the advantage of the annulus collector 28 not being evacuated when switching from quick-lift to normal operation and therefore requires no volume flow to build up pressure in the annulus collector 28. It also prevents plunging the bar down when switching into the bar middle position.

Figure 4:
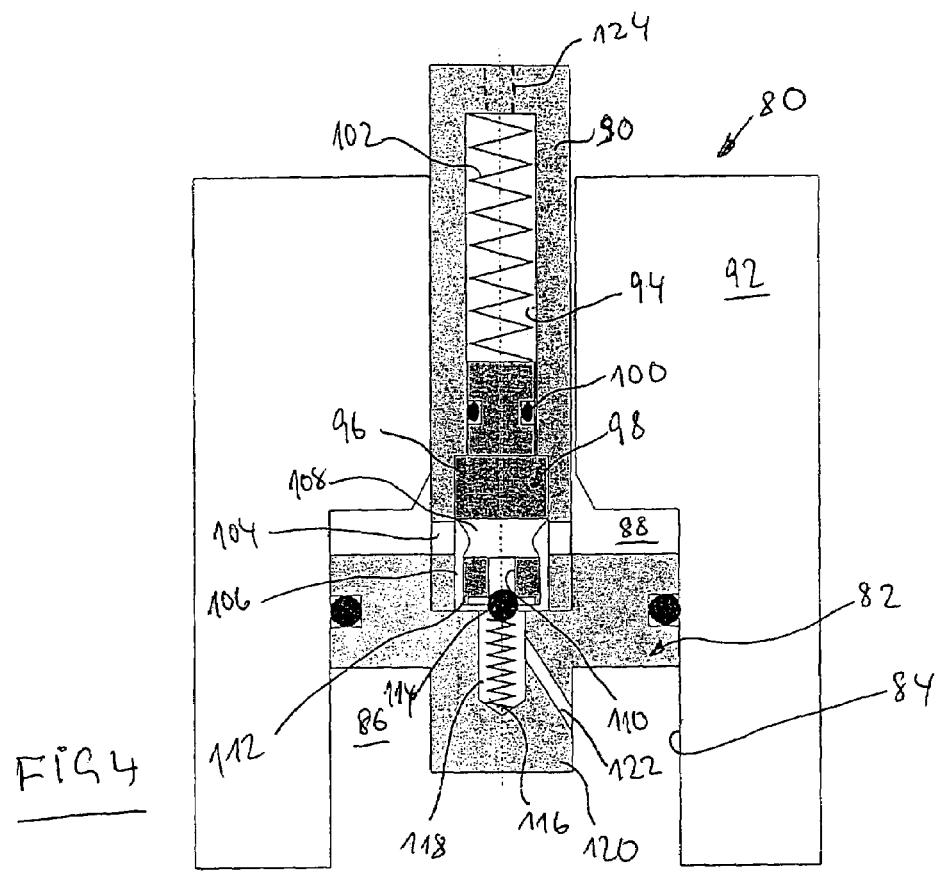
FIG. 4 shows a schematic cutout of a piston pump according to the invention during the pumping stroke.
Figure 5:
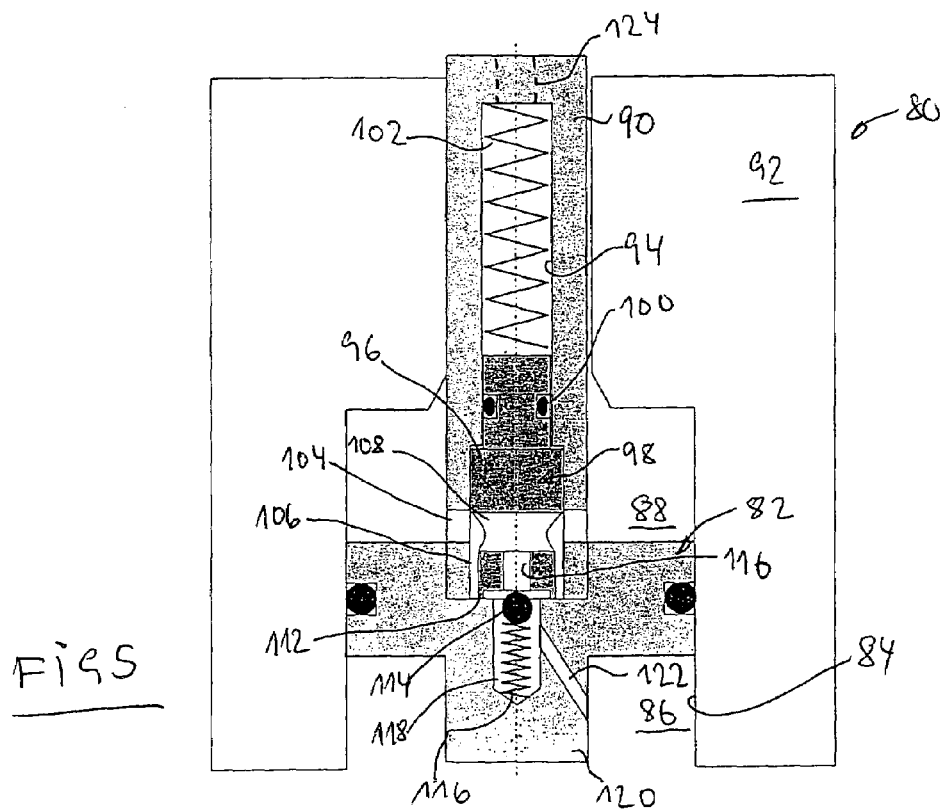
FIG. 5 shows the same view as in FIG. 4 but during the suction stroke.

In FIGS. 4 and 5, the way that a piston pump 80 could be used for the piston pump 24 according to FIG. 1 to 3 is shown graphically. A piston 82 is guided, sealed inside a cylinder 84 and divides the cylinder 84 into a piston chamber 86 and an annulus collector 88. The seal on the piston chamber and its connection with the lift cylinder are not shown in detail. A piston rod 90 is run in a guide channel of a housing 92 that is not shown in detail and is linked with a bar of the hand fork-lift truck which is also not shown. The rod 90 has an axial hole 94 which a guide segment 96 of a valve element 98 is run in. A seal 100 ensures that the area above the valve element 98, in which a spring 102 is located, is sealed. The rod 94 has radial holes 104 situated above the piston 92 and these provide a connection with an axial annulus collector 106 between the valve element and the wall of hole 94. These also connect a cross-channel 108 in the valve element 98, which is connected with an axial channel section 110 in the valve element 98. This leads down to the end of the valve element 98. A valve surface is made of a ring-formed axial collar 112 which makes a seal against the end surface of the hole 94 if the collar 112 lies against the sealing surface as in FIG. 5. In FIG. 4, the valve element 98 is raised above spring 102. There is a valve ball 114 in the axial collar which is pressed with a seal by a spring 116 against the edge of the hole segment 110. The spring 116 sits in a blind hole 118, which is formed in an axial socket 120 of the piston 82. The blind hole 118 is connected with the piston chamber 86 via an angled channel 122.

FIG. 4 shows how the axial collar 112 is lifted by the sealing surface in pump operation so that during the pumping stroke, i.e. piston 82 stroke downward as in FIG. 4, hydraulic oil can flow through channel 122 and the annulus gap 106 into the annulus collector 88 through the radial holes 104 and the cross channel 108. This operation is called normal operation in FIG. 1 to 3, i.e. larger ratio and heavy load. The pressure, that is required, to raise the valve element 98, is determined by the effective surface of the valve element 98 and the spring 102 which opposes the set pressure on the valve element 98. Otherwise, the pressure in the spring-chamber is constant, which, as shown, is closed off against atmosphere. During the described adjustment of the valve element 98, a minimal compression of the gas intake occurs but this is negligible as far as effective force is concerned. The important thing is that the spring-chamber remains under constant pressure which can also be achieved if the spring-chamber has been connected with atmosphere with a hole 124 indicated by a dashed line. An enclosed spring-chamber has the advantage that when the seal 100 leaks, oil leakage can flow into the spring-chamber but not to the outside. The cross-section of the annulus gap 106 is optimized. On one hand it causes a throttling effect as shown with throttle 44 in FIGS. 1 and 2. On the other hand, there should not be too much throttling effect in order to prevent any unnecessary loss during pumping operation.

During the return or suction stroke, as shown in FIG. 5, the valve ball 14 opens and enables a return flow of hydraulic oil from the annulus collector 88 into the piston chamber 86. The valve ball with its valve seat corresponds with the check-valve 40 according to FIGS. 1 and 2 in this instance.

Figure 6:
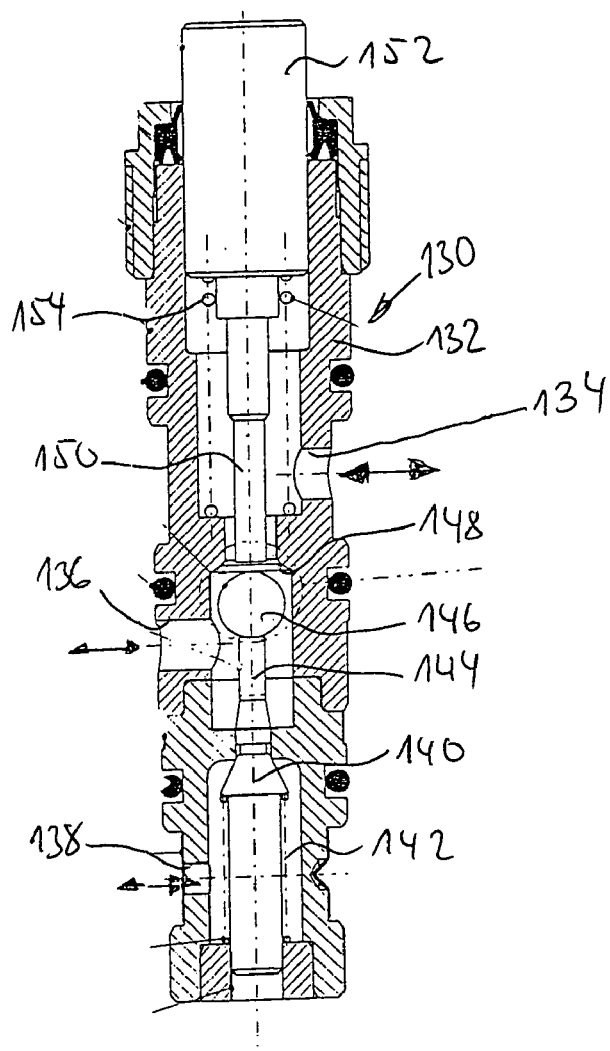
FIG. 6 shows a cutout through a control valve assembly of standard construction.
Figure 7:
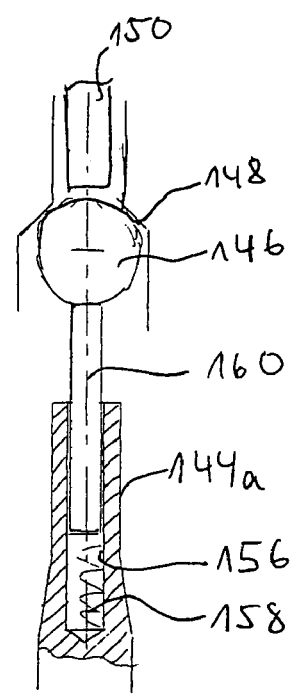
FIG. 7 shows a modification of a part of the control valve assembly according to FIG. 6.

FIG. 6 shows a standard control valve arrangement 130, as it could be used for the control valve arrangement 14 according to FIG. 1 to 3 for instance. In a housing 132, which is not shown in detail, a continuous, staged hole is planned which is connected in the upper segment via cross channel 134 with the tank of the pump assembly. A second cross channel 136 underneath is connected with the piston pump which is not shown here. A third cross channel 138 is connected with the lift cylinder which is also not shown here. A valve element 140 is located between the cross channels 136 and 138 and is pressed against a sealing surface which is not shown here by a spring 142. A tappet 144 is also connected with the valve element 140 which works with a valve ball 146. The valve ball 146 interacts with a seal-seat 148 and a second tappet 150 stretches through the seal-seat 148 and is connected with a guide segment 152 which is guided through and sealed in a hole section and is pressed in place by a spring 154. The guide segment 152 is activated by an activation element on the bar of the hand fork-lift truck which is not shown here. The valve ball 145 has relatively free movement between the ends of the tappet 144, 150 and cannot touch the valve seat 148 in the position of the tappet 150 as shown in FIG. 6. This position corresponds with the position of the control valve arrangement 14 according to FIG. 1 to 3 (neutral position). If the tappet 150 is moved downward, it presses the tappet 144 with the valve ball 146 and the valve element 140 down in turn which causes a connection between the cross channels 136, 138. This makes a connection from the piston pump and the lift cylinder with the tank of the piston assembly and the lift cylinder can go down. If the tappet 150 is moved upward, the valve ball 146 can lie against the seal-seat 148 if a corresponding differential pressure is generated, which is the case, if pressure is generated by the pump, which adjusts the valve element 140 against the spring 142 so that the piston can be raised in the lift cylinder. FIG. 7 shows a modification of the tappet 144.

In FIG. 7, the tappet 144 is identified according to FIG. 5 with 144a. As can be seen, it has a hole 156 that holds a spring 158. The spring pushes on another tappet 160 which contacts the valve ball 146. The valve ball is therefore held permanently against the seal-seat 148, unless it is lifted away from it by tappet 150. The arrangement shown allows the distance to reaching the switching pressure for the reversing valve according to FIG. 1 to 5 to be minimized.

Figure 8:
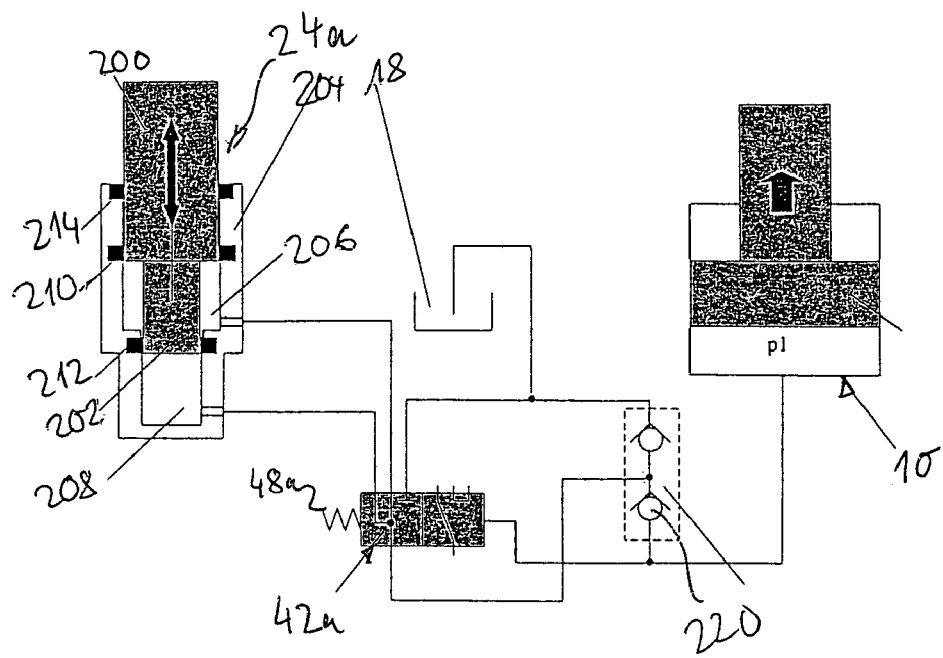
FIG. 8 shows a block diagram for an alternative embodiment of a piston pump for a pump assembly according to the invention.
Figure 9:
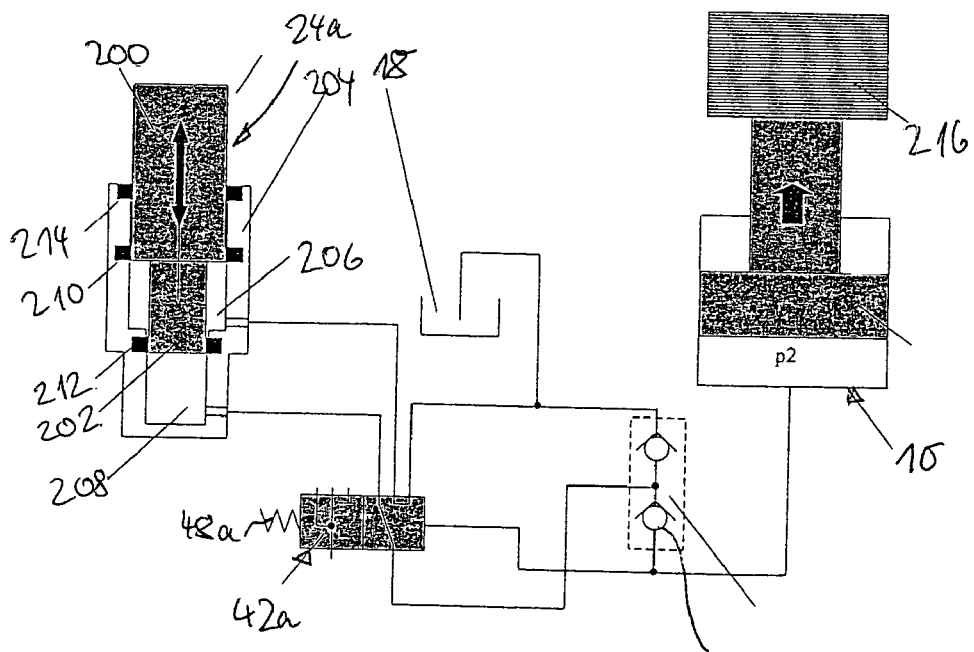
FIG. 9 shows a similar view to FIG. 8 but in another operating status.

As long as the parts shown in FIGS. 8 and 9 correspond with those in FIG. 1 to 3, the same reference numbers are used. You can see in FIGS. 8 and 9 that a piston pump has a single-piece differential piston with an upper piston segment 200 of a larger diameter and a lower piston segment 202 having a smaller diameter. The differential piston is located within a correspondingly constructed pump cylinder 204 where an annulus collector 206 and a piston chamber 208 are located. Between the piston segments 200, 202 are seal rings 210, 212 in the pump cylinder 204. A wiping ring 214 is also located close to the upper open end of the pump cylinder 204 for the end of the piston segment 200 that points outward, and this works with the bar-lever that is not shown here.

A reversing valve 42a has two positions. On is shown in FIG. 8 and the other is in FIG. 9. The slider of the reversing valve 42a is pressed from one side with a spring 48a and on the other side with the pressure in the lift cylinder 10. In the position shown in FIG. 8, the reversing valve 42a connects the two cylinder chambers 206, 208 with the lift cylinder. Activating the lift cylinder of the pump 24a according to the double-arrow causes a quick upward movement of the piston of the lift cylinder 10. This is because the ring surface of the piston segment 200 as well as the piston surface of the piston segment 202 both affect the piston of the lift cylinder 10. If the pressure in the lift cylinder is increased from P1 to P2 because of the load 215 according to FIG. 9, as of a certain predefined value, it causes the reversing valve 42a to switch into the position shown in FIG. 9, in which the annulus collector 206 is connected with the tank 18 and the piston chamber 208 with lift cylinder 10, in this way, the piston segment 202 generates the volume to activate the lift cylinder 10 with the increased pressure P2. This causes reduced lift cylinder speed but the activation power for the piston pump 24a is also decreased however.

The lost power in the second stage is very low since the medium from the annulus collector 206 flows in or out of the tank with no pressure.

The invention claimed is:

1. Pump assembly for the lift cylinder of a hand fork-lift truck with the following characteristics:
    A piston pump (24, 80), which is activated by a bar on the hand fork-lift truck and has a piston chamber (26, 86) and an annulus collector (28, 88),
    a three stage control valve (14, 130), which in a lowered lift cylinder (10) position connects with a tank (18), in a neutral piston chamber (26, 86) setting connects with a tank and in a pump setting connects the piston chamber (26, 86) through a first check-valve (56) with the lift cylinder (10) and through a second check-valve (58) with the tank,
    a third check-valve (40) between the piston chamber and the annulus collector (26, 28), which opens up to the piston chamber,
    a reversing valve (42, 98) between the piston chamber and the annulus collector (26, 28, 86, 88), which has its valve element pressed into the closed position by a spring (48, 102) and on the opposite side is pressed by the pressure of the piston chamber (26, 86) whereby the valve element (98) of the reversing valve (42, 98) opens if the pressure in the piston chamber (26, 86) achieves a certain predefined value, whereby
    the valve element (98) seals on the side of the spring (48, 102) and is pressed against with a standard constant pressure.

2. The pump assembly according to claim 1, characterized in that the constant pressure is atmospheric pressure or tank pressure.

3. The pump assembly according to claim 1, characterized in that the constant pressure is generated from an accumulator (50).

4. The pump assembly according to claim 1, characterized in that a throttle (44) is planned in a reversing valve (42).

5. The pump assembly according to claim 1, characterized in that tension is put on the second check-valve (58) by a spring pressing it into the closed position.

6. The pump assembly according to claim 1, characterized in that switching this reversing valve is made in that the annulus collector is connected with the tank before the reversing valve switches and connects the piston chamber with the annulus collector.

7. The pump assembly according to claim 1, characterized in that an axial hole is planned in the pump piston (82), in which a guide segment (96) of the valve element (98) is guided axially and is sealed, the spring (102) presses on the guide segment (96), the valve element (98) has a ring-formed valve surface on the opposite end which works with a sealing surface of the hole (94) which is connected from the area enclosed by the sealing surface through a channel (22) in the pump piston (82) with the piston chamber (86) and then creates an axial gap (106) on the sealing surface of the valve element (98) which is connected with the annulus collector (88) through a radial hole (104) in the pump piston (82).

8. The pump assembly according to claim 7, characterized in that a valve ball (114) which has pressure put on it by a spring (116) in an enclosed area works together against the end of an axial hole segment (116) of a connection channel sealed in the valve element (98) which is always connected with the radial hole (104) which connects the annulus collector (88) with the piston chamber (86) if the ball (114) is raised from the hole segment (116) by the spring.

9. The pump assembly according to claim 7, characterized in that the spring-chamber is mainly a sealed enclosure.

10. The pump assembly according to claim 1, characterized in that the control valve (130) has a first tappet (150) which pushes on a valve ball (146) through a ring-formed valve seat (148), a second tappet (160) on the opposing side of the valve ball (146) and is connected with a valve element (140) of the switch valve whereby the piston chamber is connected under the valve ball (146) and above the switch valve (140) and the valve ball (146) closes and the switch valve (140) opens, if pump pressure is generated in the piston chamber and in lowering operation, the switch valve (140) is opened by the first tappet (150) through the valve ball (146) and the second tappet (160) and that the second tappet (146) is pressed upon by a spring (158) which is supported against the valve element (140).

11. The pump assembly according to claim 1, characterized in that the tension spring in the reversing valve is made of a cellular elastomer, located in a spring-chamber.

12. Pump assembly according to claim 1, characterized in that the pump piston consists of two piston segments (200, 202) of different diameters, which are sealed in corresponding cylinder segments of the pump cylinder (204), whereby the piston chamber (208) is made of a piston segment of a smaller diameter and the annulus collector (206) of the piston segment (200) with a larger diameter.

13. Pump assembly according to claim 12, characterized in that the piston segment (200) is made with the larger diameter out of the open end of the pump cylinder (204) and a wiping ring (214) close to the open end of the pump cylinder (204) for the piston segment (200).

14. Pump assembly for the lift cylinder of a hand fork-lift truck with the following characteristics:

- A piston pump (24, 80), which is activated by a bar on the hand fork-lift truck and has a piston chamber (26, 86) and an annulus collector (28, 88),
- a three stage control valve (14, 130), which in a lowered lift cylinder (10) position connects with a tank (18), in a neutral piston chamber (26, 86) setting connects with a tank (18) and in a pump setting connects the piston chamber (26, 86) through a first check-valve (56) with the lift cylinder (10) and through a second check-valve (58) with the tank (18),
- a reversing valve (70) between the piston chamber and the annulus collector (26, 28), the valve element of which has pressure on it provided by a spring (76) in one direction and on the other side is pressed on by the pressure in the lift cylinder (10) whereby the valve element of the reversing valve (70) opens if the pressure in the lift cylinder (10) achieves a predefined pressure value, whereby
- the valve element seals on the side of the spring (76) and is pressed against with a standard constant pressure.

15. The pump assembly according to claim 14, characterized in that the constant pressure is atmospheric pressure or tank pressure.

16. The pump assembly according to claim 14, characterized in that the constant pressure is generated from an accumulator (50).

17. The pump assembly according to claim 14, characterized in that a throttle (44) is planned in a reversing valve (42).

18. The pump assembly according to claim 14, characterized in that tension is put on the second check-valve (58) by a spring pressing it into the closed position.

19. The pump assembly according to claim 14, characterized in that switching this reversing valve is made in that the annulus collector is connected with the tank before the reversing valve switches and connects the piston chamber with the annulus collector.

* * * * *